United States Patent [19]

Huffman et al.

[11] Patent Number: 4,676,990
[45] Date of Patent: Jun. 30, 1987

[54] DEHYDRATED LEGUME PRODUCT AND PROCESS FOR PRODUCING SAME

[75] Inventors: Samuel J. Huffman; Joel R. Tinsley, both of Blackfoot, Id.

[73] Assignee: Basic American Foods, San Francisco, Calif.

[21] Appl. No.: 647,644

[22] Filed: Sep. 6, 1984

[51] Int. Cl.⁴ ............................................. A23L 1/20
[52] U.S. Cl. ..................................... 426/634; 426/460; 426/461; 426/464; 426/640; 426/506; 426/508
[58] Field of Search .............. 426/634, 459, 460, 461, 426/457, 456, 464, 640, 506, 508

[56] References Cited

U.S. PATENT DOCUMENTS

| | | | |
|---|---|---|---|
| 202,975 | 4/1878 | Andres | 426/461 |
| 1,011,730 | 12/1911 | Braunbeck | 426/460 |
| 1,088,741 | 3/1914 | Stephens | |
| 1,509,076 | 9/1924 | Bercreller | 426/461 |
| 1,813,268 | 7/1931 | Bachler | 426/457 |
| 1,859,279 | 5/1932 | Chamberlain et al. | 426/634 |
| 2,026,676 | 1/1936 | Gill | 426/460 |
| 2,343,149 | 2/1944 | Krause, Jr. | |
| 2,475,554 | 7/1949 | Moller | 426/459 |
| 2,657,999 | 11/1953 | Rauch | |
| 3,067,042 | 12/1962 | Pader | 426/457 |
| 3,253,930 | 5/1966 | Gould et al. | 426/459 |
| 3,275,458 | 9/1966 | Willard | 426/457 |
| 3,290,159 | 12/1966 | Dorsey | 426/461 |
| 3,291,615 | 12/1966 | Thompson et al. | 426/461 |
| 3,317,324 | 5/1967 | Austin et al. | 426/459 |
| 3,594,185 | 7/1971 | Hawley et al. | 426/634 |
| 3,594,186 | 7/1971 | Hawley et al. | 426/634 |
| 3,598,610 | 8/1971 | Hawley et al. | 426/634 |
| 3,787,595 | 1/1974 | Folzenlogen et al. | 426/460 |
| 4,022,919 | 5/1977 | Comer | 426/634 |
| 4,153,738 | 5/1979 | Ronai et al. | 426/457 |
| 4,233,322 | 11/1980 | Fritze | 426/634 |
| 4,251,558 | 2/1981 | Kobayashi et al. | |
| 4,273,796 | 6/1981 | Maxcy et al. | 426/634 |
| 4,359,480 | 11/1982 | Kock | 426/456 |
| 4,407,840 | 10/1983 | Lathrop et al. | |

FOREIGN PATENT DOCUMENTS

| | | |
|---|---|---|
| 562648 | 7/1944 | United Kingdom |
| 648373 | 1/1951 | United Kingdom |
| 783974 | 10/1957 | United Kingdom |
| 938381 | 10/1963 | United Kingdom |
| 1017519 | 1/1966 | United Kingdom |
| 2118421 | 2/1982 | United Kingdom |

*Primary Examiner*—Steven Weinstein
*Attorney, Agent, or Firm*—Sandler & Greenblum

[57] ABSTRACT

Legumes, such as beans, are hydrated, and cooked to form a mash prior to forming the resultant mixture into shapes suitable for dehydration to a storage-stable moisture content. The dehydrated bean product has a bulk density greater than about 0.28 gm/cc, and a rehydration ratio within the range of 1.75 to 3.75:1.0, and is capable of substantially uniform reconstitution which does not require physical agitation. The hydrated product is particularly suitable for the preparation of refried beans.

28 Claims, No Drawings

DEHYDRATED LEGUME PRODUCT AND PROCESS FOR PRODUCING SAME

BACKGROUND OF THE INVENTION

1. Technical Field of the Invention

The present invention relates to the production of products containing dehydrated legumes. More particularly, this invention is directed to a process for producing dehydrated bean products containing descernible bean pieces. The dehydrated products are capable of essentially instant, substantially uniform reconstitution upon the addition of water.

2. Discussion of Material Information

Legumes are a plentiful and economical source of nutrition. Beans, peas, and other leguminous materials have been conventionally prepared using a variety of procedures to produce different products which are now staples in our diet. In recent years, numerous attempts have been made to dehydrate leguminous materials to render them quickly reconstitutable to permit them to be easily prepared for consumption, for example into soups and similar products.

U.S. Pat. No. 1,088,741, STEPHENS, illustrates a process for the preparation of a dehydrated bean product which involves first parboiling beans in an aqueous solution containing sodium bicarbonate, followed by rinsing and cooking the beans in salt water until tender. The cooked beans are then pressed into flakes and dried until crisp and brittle. The bean flakes may be prepared for consumption by pouring boiling water over them.

U.S. Pat. No. 2,343,149, KRAUSE, Jr., is another example of a process which relates to the preparation of legumes, such as peas and beans, to produce a completely precooked and thoroughly dehydrated powder. The process involves exposing precooked, pulpy leguminous material to high heat and pressure between rollers to completely dehydrate the material into flake form. The dehydrated flakes may then be reduced in particle size to a powder, for example using a hammer mill. The dehydrated flakes or powder may be mixed with suitable seasonings, salt, etc., to form a concentrate which will dissolve in water to form a thick puree-type product.

U.S. Pat. No. 2,657,999, RAUCH, is directed to the preparation of precooked peas and beans in other than powder form. The process involves subjecting fully saturated, cooked beans to the action of a hammer mill to reduce them to a particulate form having a size not substantially larger than ⅛ inch. The particulate product is spread onto drying trays and dehydrated to a moisture level of less than about 7%. The resultant dehydrated bean and pea material may then be blended with prepared fatty materials, salt and seasoning in the preparation of, for example, a soup mixture.

U.S. Pat. No. 4,251,558, KOBAYASHI et al., relates to the production of a dry, granular bean paste. The process involves the extrusion of bean paste into a vacuum chamber to dehydrate the same. This is followed by further dehydration and treatments to reduce the particle size of the extrudate.

More recently, refried beans have become generally more popular as a food item, particularly in the food service industry, such as restaurants which specialize in Mexican-style meals. In an attempt to provide an alternative to the procedures involved in the preparation of refried beans from beans in their natural state, canned refried beans and dehydrated bean powders have been developed.

U.S. Pat. No. 4,407,840, LATHROP et al., is directed to a process for producing a dried bean product which is disclosed as being instantly reconstitutable to form a product having the flavor, color, and texture of conventional refried beans. The process involves cooking raw beans in the presence of water. The beans are preferably blanched in their dry state prior to cooking in a pressure cooker. The beans are discharged from the pressure cooker in such a manner so that the pressure drop is almost instantaneous and the resultant flashing-off of water as steam when the beans are removed from the pressure cooker, causes the beans to undergo a substantial physical degradation. A bean slurry containing finely divided bean mash, whole bean pieces, and bean skin particles is disclosed as being formed as a result of such degradation. The slurry may also be subjected to a milling procedure to render it more suitable for subsequent dehydration. Dehydration is preferably carried out on single or double drum dryer to a moisture content of less than about 6% by weight. The dried product, having a loose pour density of about 0.24 to 0.28 gm/ml, is disclosed as being instantly reconstitutable in either hot or cold water to yield a product simulating typical refried beans.

Such prior art attempts to produce instantly reconstitutable bean and pea products have not been completely successful in arriving at a product which will simulate the organoleptic characteristics of a product freshly made from beans in their natural condition. Dehydrated powders, for example, tend to reconstitute into a smooth paste which does not have a discernible crunchy texture that products produced from natural raw material exhibit. Moreover, dehydrated bean powders tend to cake during storage and are difficult to reconstitute uniformly without vigorous mixing and agitation.

The preparation of bean products from natural raw material is often found to be unsuitable in situations which require frequent preparation of large volumes of the food product, for example in restaurants. This is largely due to the time consuming procedure involved in the conventional preparation of bean products, such as refried beans. For example, a typical on-site preparation of refried beans in a restaurant involves inspecting and washing the raw material in fresh water prior to mixing the clean beans with measured quantities of water, salt, and lard. The mixture is usually cooked in a pressure cooker for about two hours following which the ingredients are mixed to the desired consistency. Afterwards, the mixture, which usually includes cooked bean fragments, must be stored in a refrigerator until it is refried in preparation for consumption.

Products such as these prepared in bulk often suffer from inconsistencies in quality, including moisture content, because of deviations from proper weighing and measuring procedures. In preparations in which all of the procedures are performed by hand, stirring the beans to mash them will vary from person to person. Moreover, strict attention must be paid to burner control in order to ensure proper evaporation of water during cooking and to prevent scorching from occurring. In addition, the degree to which the beans are cooked will vary from batch to batch depending on the way in which the foregoing procedures are carried out. All of this contributes to inconsistencies in product quality. Furthermore, pressure cooking and handling of hot refried beans can be dangerous when performed in a typical restaurant kitchen due to limited floor space, heavy traffic, and operating personnel who are often unfamiliar with pressure cooking techniques.

SUMMARY OF THE INVENTION

The present invention thus provides an improvement in the production of dehydrated legumes being capable of essentially instant, substantially uniform reconstitution into food products which exhibit organoleptic characteristics closely simulating those which are manifested in similar products prepared from natural raw material.

An object of the present invention is the production of an instant product made from a mixture of cooked leguminous material which is formed into shapes, and then dehydrated to a moisture content of 4 to 12%, preferably 6 to 8% by weight, to result with a legume product having a bulk density of 0.28 gm/cc to 0.56 gm/cc, preferably within the range of 0.35 to 0.45 gm/cc, and a rehydration ratio within the range of 1.75 to 3.75:1.0.

It is another object of the present invention to provide a process for the production of dehydrated legume products which contain an amount greater than about 5% and preferably within the range of 9–30% by dry weight of legume particles having a size greater than 12 mesh.

It is also the object of the present invention to provide a process for rehydrating a dehydrated legume product containing an amount greater than 5% by dry weight of particles having a size larger than 12 mesh to produce a reconstituted legume product containing legume particles having a size larger than 12 mesh in said amount.

And yet another object of the invention is to add legume particles, preferably provided by dehydrated legume product produced in accordance with the process of the present invention, to the mash when forming the mixture. Alternatively legume particles are blended with the mash or the dehydrated legume product made in accordance with the present invention.

Another object of the present invention is to produce dehydrated legume products shaped to have a size larger than about 20 mesh and preferably within the range of ⅛ to ½ inch.

A further object of the present invention is to provide a process for producing a dehydrated legume product wherein a mixture of cooked bean material is provided by subjecting legumes and water to heat, preferably in a closed vessel, to result in a cooked leguminous material having a moisture content within the range of about 45 to 75% and preferably within the range of about 50 to 65% by weight, and forming said cooked leguminous material into a mash including a mixture of finely divided and particulated leguminous material. The mixture also preferably includes lipid material and salt in addition to optional seasonings, spices and flavoring.

A still further object of the present invention is to cook the legumes in a rotating vessel wherein the legumes are agitated during cooking, preferably while the vessel is rotated once every two to five minutes, and venting said vessel for between 10 to 60 seconds after each rotation.

DETAILED DESCRIPTION

Although the process of the present invention can be used in processing most leguminous materials, such as peas of the Pisum genus and beans of the Phaseolus genus, including beans such as pinto, pink, red, etc., the process in accordance with the present invention will be described for convenience with respect to pinto beans.

Pinto beans are first inspected and washed using conventional procedures to free the same of foreign material, debris, and defective beans.

Following this procedure, one alternative provides for reconstituting the raw beans, normally having a moisture content within about 6–18% percent by weight, to a higher moisture content, preferably within the range of 40 to 50% by weight, prior to cooking. Rehydration may be accomplished by soaking the beans in water having a temperature of about 55° F. for about 16 to 24 hours. When reconstitution is effected in water having a temperature of about 190° to 210° F., the rehydration time is normally reduced to between about 40 minutes and 2 hours. It has generally been found that rehydration time is inversely proportional to the temperature of the rehydration medium.

Cooking should be carried out in the presence of an aqueous medium, such as hot water or steam, in any vessel which is suitable for this purpose. Particularly good results are achieved in a pressure cooker at pressures generally in excess of 10 psig. Although pressures up to 30 psig have been used with success, pressures within the range of 10–25 psig for cook times ranging from 45 minutes to 2 hours are preferred. Pressures in excess of 30 psig may also be used.

In those instances in which dry beans having a moisture content within the range of about 6 to 12% by weight are cooked directly without being previously rehydrated, cooking pressures below about 20 psig for times in excess of 60 minutes can be used with acceptable results. When cooking dry beans directly, the beans are introduced into the pressure cooker together with a suitable amount of water to result in a cooked product containing 45 to 75% by weight moisture.

It has been found desirable to vent head space vapors from the pressure cooker during cooking at elevated pressures. This may be done to remove raw, green flavors from the cooked beans so as to result with an improved taste in the finished product. Typically, after 5 to 10 minutes of cooking, the vessel may be vented, preferably for 20 to 60 seconds or longer.

Moreover, it has been found that agitating the beans during the cooking process also yields particularly good results. A preferred manner for doing so involves rotating the cooking vessel at about 4 rpm every 2 to 5 minutes during the cooking cycle. This may be followed by venting the head space vapour for 10 to 60 seconds after each rotation.

Following cooking, the beans are mashed into a mixture of bean pieces or particulated bean material and finely divided bean material such as a paste. During this stage of the process, additional ingredients including lipid materials such as lard, salt, and other ingredients such as spices, seasonings and flavorings may be mixed with the cooked beans. Alternatively, such ingredients may be introduced with the beans into the cooker and cooked simultaneously therewith. During mashing and mixing, care must be exercised to avoid excessive disruption of the cellular structure of the bean material. Otherwise, the mash will consist almost exclusively of finely divided bean material which will result in a smooth paste lacking discernible bean pieces. Too little mixing, however, will not distribute the lard and salt properly.

The moisture content of the mixture of bean material and other ingredients, such as lard and salt, has been found to affect the resultant density and reconstitution characteristics of the finished-dried product. The preferred moisture content of the mixture at this stage of the process falls within the range of 45 to 75%, and more preferably 50 to 65%. The moisture content of the mixture of bean material can be affected by condensation of steam during cooking and may be adjusted by adding water to the mixture if an increase is necessary. Alternatively, finished-dried, dehydrated legume product produced by the process of the present invention may be added back to the mixer in order to decrease the moisture content of the mixture to the proper extent.

In addition to affecting the moisture content of the mash, adding-back finished-dried, dehydrated legume product at this stage of the process can also be used to increase the amount of legume particles larger than 12 mesh in the mash. As disclosed herein, the finish-dried product of the present invention should contain a sufficient amount of leguminous material having a particle size larger than 12 mesh so that the reconstituted product contains particles in an amount greater than about 9% upwards to 30% by dry weight or more. If for some reason the cooked mash does not contain the prescribed amount of particulated leguminous materials, an amount of "add-back" finished dried product of the present invention, containing legume particles, can be introduced into the mixer at this stage of the process to adjust the particle content of the mash so that the resultant product will have the necessary characteristics as disclosed herein. Alternatively, conventionally prepared legumes, such as cooked, dried or cooked and dried beans, which may be either whole and intact or in a subdivided condition, can be subjected to a procedure which reduces their size to no less than about 20 mesh and preferably larger than 12 mesh prior to being added to the mash in order to adjust the particle content thereof.

The level of lipid material in the mixture as well as its moisture content has also been found to affect the characteristics of the final product. Lipid materials, such as lard, may be used in amounts up to about 25% without adversely affecting the quality of the final product. Substantially higher levels of lipid materials, however, tend to impede moisture absorption and necessitate longer mix times to reach the desired consistency. Related to the fact that lipid materials do not absorb water during reconstitution, it has been discovered that the volume of water necessary to reconstitute a specified volume of dried product varies inversely to the lipid content of the dried product. Thus, a specified amount of dehydrated legume material having no extraneous lipid material is capable of absorbing a greater amount of water on a dry weight basis than the same amount of dehydrated material having a higher added lipid content. For example, a leguminous product made in accordance with the present invention to have no added lipid material can be fully reconstituted by adding 2.5 to 2.6 parts of water to one part dry material, whereas the same amount of product of which 25% by total weight is made up of lipid is completely reconstituted with only 1.9 to 2.0 parts water for each part of the dry product. Inasmuch as the water of rehydration displaces the void volume surrounding the dry pellet during reconstitution, the bulk density of the product varies inversely to the amount of water required for complete reconstitution. Hence, it has been found that dried legume products made in accordance with the present invention which have no added lipid material should be formed to have a bulk density within the range of 0.28 to 0.45 gm/cc, whereas products containing up to about 25% lipid material should have bulk desities within the range of about 0.35 to 0.56 gm/cc. in order to completely reconstitute without the need for physical agitation or mixing.

Following mixing, the bean mixture is then formed into suitable shapes for drying. The ultimate object of this forming procedure is to put the mixture into a condition that lends itself to essentially instant, substantially uniform reconstitution with a minimum of physical agitation. Preferably, the bean mixture is formed into suitable shapes by forcing the mixture through an extruder die plate having holes with a diameter in the range of greater than ⅛ inch but preferably less than ½ inch. A single or twin auger may be used to transfer the bean mixture through the extruder. Although low pressure extrusion techniques are preferred, the novel product of the present invention can be formed by any method which will produce the desired characteristics in the final product. Included among suitable forming processes are rolling the bean mixture into a sheet and cutting, or otherwise subdividing, the sheet into pieces such as strips, or forming in the pelletizing apparatus.

The formed shapes of bean mixture, preferably having a piece size within the range of ⅛ to ½ inch, are then dehydrated to a shelf-moisture content of less than about 15%. Typically, the bean material is dried to a moisture content within the range of 4 to 12% by weight, and preferably within the range of 4 to 8% by weight. Dehydration may be accomplished at temperatures within the range of 120°–250° F. Preferably this is carried out using forced air at flow rates of 150–1500 fpm. A fluidized bed dryer having inlet air temperatures of 140° to 180° F. and air flow rates of 1000–1200 fpm has been found to be particularly suitable for purposes of the present invention.

The dehydrated legume product produced in accordance with the present invention has a loose pour or bulk density of greater than 0.28 gm/cc, but less than 0.56 gm/cc. Preferably bulk densities fall within the range of about 0.35 to 0.45 gm/cc for pellets having a size within the range of about ⅛ to ½ inch. Bulk density of the product produced in accordance with the present invention means the weight thereof per unit volume. As used herein, "bulk density" is expressed in terms of grams per centimeters, whereas "bulk index" is expressed in terms of centimeters per 100 grams.

Another characteristic which the dehydrated legume product made in accordance with the present invention exhibits is an initial rehydration ratio within the range of 1.75:1.0 to 3.75:1.0. For purposes of this application, the rehydration ratio of a dehydrated product means the ratio of the weight of the reconstituted product to the weight of the dehydrated product. As used herein, initial rehydration ratio means the rehydration ratio which is achieved during the first 90 seconds of rehydration.

Rehydration ratios may be determined by pouring 150 gm of water having a temperature of 200° F. over 50 gm of dry bean product contained in a 500 ml beaker. After prescribed times, the excess water is drained from the product for 15 seconds through a 20-mesh Tyler screen and measured. For purposes of determining initial rehydration ratios this procedure is carried out at intervals of 5, 10, 20, 30, 45, 60 and 90 seconds for the different sample batches.

Related to this is the initial moisture absorption rate of the dehydrated product. As used herein, moisture absorption rate is expressed in terms of grams of water absorbed per grams of dry product per second. The same physical procedure used for determining the rehydration ratio is used for calculating the moisture absorption rate. It has been found that initial moisture absorption rates which fall outside the range of 0.15 to 0.55 for 5-second reconstitution fail to rehydrate in an acceptable manner for purposes of the present invention.

The size of the dehydrated legume product made in accordance with the present invention should be controlled within prescribed limits so as to permit uniform reconstitution with water without mixing or other physical agitation being required. Thus, it has been found that dried product having a size smaller than about 20 mesh tend to obstruct the flow of water around the particles of dried product, thereby preventing thorough reconstitution thereof. On the other hand, when the dehydrated legume product has been shaped to have a piece size larger than 20 mesh, water quickly flows freely throughout the pieces of dried product, thereby permitting an even exposure of product to water which results with a quick and uniform reconstitution manifested by an even moisture distribution within the reconstituted product. As used herein, mesh size refers to standard Tyler screens.

The dehydrated bean product of the present invention preferably contains a prescribed amount of bean pieces or particles having a discernible size. This insures that upon subsequent reconstitution in preparation of the product for consumption there will be a detectable chunkiness normally associated with a product made from natural beans. In contrast, a smooth pasty texture typically results when conventionally prepared, small size particles or powders are rehydrated. Thus, dehydrated legume products produced in accordance with the present invention should contain a sufficient amount of legume particles so that the reconstituted product contains greater than about 5% by dry weight of bean particles having a size larger than 12 mesh. The percent by dry weight of bean particles having a size larger than 12 mesh which are present in the product of the present invention preferably falls within the range of about 9–30% on dry weight basis, although products have been made with greater than 30% by dry weight of bean particles larger than 12 mesh.

As a practical matter, on a dry weight basis the amount of bean particles having a size larger than about 12 mesh in the dehydrated legume product of the present invention has been found to correspond essentially to the amount of bean particles of such size in a product reconstituted therefrom. Thus, for purposes of the present invention, the amount of bean particles is expressed on a dry weight basis. Related to this, dehydrated legume products may be made in accordance with the present invention from the legume material alone or in admixture with other ingredients, such as lard. For the sake of consistency, therefore, the amount of bean particles contained in the product is expressed on a dry weight basis in terms of nonlipid solids. The amount of particles in the product having a size larger than about 12 mesh can be determined by reconstituting a weighed sample of dehydrated legume product of known formulation with a predetermined amount of water at selected temperature. The reconstituted legume product is then placed on a Tyler screen having a #12 mesh size and sprayed with water to wash legume material smaller then 12 mesh therethrough. The legume material having a particle size larger than 12 mesh which is retained on the screen in then transferred to a drying chamber and dehydrated to a moisture content of less than 12%. The dried particles are then weighed and reported as a weight percentage of the weighted sample of dehydrated legume product prior to reconstitution. In those instances where the dehydrated legume product has been formulated to contain lard, the weight of the dehydrated legume product is adjusted for purposes of this determination by the weight of the lipid material in order to be expressed on a dry weight basis of nonlipid solids.

If, for example, a dehydrated bean product results which has an average finished piece size which falls within the range of 20 to 40 mesh and yet has a bulk density which falls within the range of 0.28 to 0.56 gm/cc., it may be capable of reconstitution but will lack discernible bean particles. In such a case, it has been discovered that cooked, dried or cooked and dried beans, which may be either whole and intact, or subdivided to a particle size of $+20$ mesh, but preferably $+12$ mesh, may be blended with the finished dried product while maintaining the average bulk density of the product within the range of 0.28 to 0.56 gm/cc. This may also be done to adjust the level of bean particles, which may be present in the finished-dried product, to within the range of 9 to 30%, in the case where excess cooking or shear during mixing or extrusion may have reduced the level of bean particles to below 9%, or to amounts greater than 30% by dry weight of the product, if so desired.

Alternatively, the finished-dried dehydrated legume product made in accordance with the present invention may be reduced in size to within the range of $-12+20$ mesh by milling or other conventional size reduction technique. So long as the resultant product exhibits a bulk density within the range of 0.28 to 0.56 gm/cc., it should reconstitute uniformly in the absence of mixing.

Dehydrated legume products produced in accordance with the process of the present invention are essentially instantly, substantially uniformly reconstituted into a product ready for consumption which closely simulates its counterpart made directly from natural raw material. The products of the present invention are unique in that essentially instant reconstitution is effected in less than about 15 minutes and preferably in less than about 5 minutes in the absence of physical agitation. By substantially uniform reconstitution it is meant that the moisture content varies less about 5% and preferably less than 3.5% by total weight within a batch of the reconstituted bean material. This can be determined by placing one pound of dehydrated bean material made in accordance with the present invention into a cylindrical vessel to which is added 2.15 pounds of water at a temperature of about 200° F. without stirring or mixing. After setting for 5 minutes, the reconstituted material is removed from the cylinder and quartered into equal sections, each of which are tested to determine the uniformity of their moisture content.

The following examples illustrate preferred embodiments for carrying out the process of the present invention. The examples also include representative tests conducted to demonstrate certain characteristics of products produced in accordance with the present invention as discussed herein. The specific details of these examples are not, however, intended to be regarded as limitations of the invention, inasmuch as they may be varied as will be understood by one skilled in this art.

EXAMPLE I

Pinto beans, grown in state of Idaho, are inspected to be free of foreign material and defective beans, and then washed. Sixty pounds of dried beans having an average moisture content of about 8% are placed in a vessel and covered with 120 pounds of cold water. The water is heated to a temperature of about 200° F. and held for 60 minutes, thereby rehydrating the beans to a moisture content of about 50%. The rehydrated beans are then transferred to a K%K Model 100 processor. Lard (10.1 lbs) and salt (2.3 lbs) are also introduced to this vessel. The K$K Model 100 processor is a batch-type pressure cooker wherein steam is injected during cooking to affect the requisite temperatures and pressures. The rehydrated beans, lard and salt mixture are cooked at 20 psig for 60 minutes while rotating the vessel and intermittently venting it to the atmosphere. During the cooking process steam condenses in the vessel thereby adding about 30 lbs. of water to the mixture. The mixture of cooked beans, lard, and salt, now having a moisture content of 57%, is then mixed for 2 minutes in a Hobart Model B-1401 VH Mixer and fed into a twin screw auger with a 3/16 inch-thick die plate having 3/16 inch diameter holes. The extruded mixture is cut into pellets and dried to a 6% moisture content in a fluid bed dryer having an air inlet temperature of 250° F. and an air velocity of 1200 fpm for about 15 minutes.

The dehydrated pellets were determined to have an average bulk density of 0.38 gm/cc. and contained about 12% by dry weight of nonlipid solids of bean particles larger than 12 mesh.

One pound of the dehydrated pellets was placed into a cylindrical vessel to which was added 2 pounds of water at a temperature of about 200° without stirring or mixing. After setting for five minutes, the reconstituted material was removed from the cylinder and quartered into equal sections.

The dehydrated pellets tested accordingly were determined to have reconstituted as follows:

| Section of Cylinder | Moisture Content |
|---|---|
| 1. Top quarter | 69.6% |
| 2. Upper Middle | 68.6% |
| 3. Lower Middle | 67.5% |
| 4. Bottom Quarter | 67.3% |

The extent of reconstitution of the pellets only varied about 2.3%. The resultant product was judged to be uniformly reconstituted and to exhibit excellent taste, texture, and appearance with noticeable amount of bean particles.

EXAMPLE II

Pinto beans, grown in the state of Washington, are inspected to be free of foreign material and defective beans, and then washed. Sixty pounds of dried beans having an average moisture content of 9% are placed in a K&K Model 100 processor. Forty-five pounds of fresh water, 10.1 pounds of lard, and 2.4 pounds of salt are added to the beans. Steam is injected into the K&K Model 100 processor to heat the mixture during cooking which is carried out for about 90 minutes. Intermittently, the cooker is rotated and vented to maintain the pressure within the vessel at about 15 psig. As a result of steam condensation, about 26 lbs. of water are added to the mixture during cooking. The cooked bean product, now having a moisture content of 55%, is then mixed for two minutes in a Hobart Model B-1401 VH Mixer and fed into a twin screw auger equipped with a ⅛ inch die plate containing ¼ inch-diameter holes. The extrudate pellets are dried to a 6% moisture content in air having a temperature of 250° F. and a velocity of 1200 fpm.

The dehydrated pellets of this example were determined to have an average bulk density of 0.40 gms/cc. and contained about 15.4% by dry weight of nonlipid solids of bean particles larger than 12 mesh.

In accordance with the testing method described above with respect to Example I, the dehydrated pellets reconstituted as follows:

| Section of Cylinder | Moisture Content |
|---|---|
| 1. Top Quarter | 67.8% |
| 2. Upper Middle | 65.9% |
| 3. Lower Middle | 65.5% |
| 4. Bottom Quarter | 65.4% |

The uniformity of reconstitution varied by only 2.4% from top to bottom. It was also judged to exhibit excellent organoleptic characteristics, the bean particles being clearly discernible.

EXAMPLE III

A batch of dehydrated bean product was made in accordance with the procedure used in Example II except that it was formulated to contain no lard and was extruded through a die plate having 3/16-inch orifice. The resultant pellets were then compared with two commercially available dehydrated bean products as to bulk density and corresponding bulk index, content of bean particles larger than 12 mesh, and capability of uniformly reconstituting in the absence of mixing.

One of the products, manufactured by Carnation Company and sold under the brand name QUE BUENO!, was identified by U.S. Pat. No. 4,407,840. This product was analyzed as having a lard content of 14% by total dry weight solids. The other product used in this comparison, manufactured by Gilroy Foods, Inc., was analyzed as containing no lard.

The dry products compared as follows:

| | Products | | | | | |
|---|---|---|---|---|---|---|
| | Invention | | | | Carnation | Gilroy |
| Lard Level (%) | 0 | 7 | 14 | 17 | 14 | 0 |
| Bulk Index (cc/100 gm) | 275 | 260 | 255 | 245 | 300 | 200 |
| Bulk Density (gm/cc) | 0.36 | 0.38 | 0.39 | 0.41 | 0.33 | 0.5 |
| Content of +12 mesh bean particles as % of nonlipid solids | 15.6 | 12.3 | 11.4 | 8.6 | 0 | 0 |

Each of these samples were then rehydrated in the following manner:

100 gms. of product were measured into a 500 ml. cylinder to which was added 200 mls. of boiling water. The contents of the cylinder were not mixed but were permitted to set for 2 minutes in a quiescent state.

The results were as follows:

|  | Products | | | | | |
|---|---|---|---|---|---|---|
|  | Invention | | | | Carnation | Gilroy |
| Lard level (%) | 0 | 7 | 14 | 17 | 14 | 0 |
| Total volume (mls) after water addition | 300 | 300 | 305 | 300 | 475 | 395 |
| Volume (mls) of supernatent water | 0 | 0 | 0 | 5 | 170 | 190 |

Referring to the Carnation and Gilroy samples, 30 mls and 20 mls of water, respectively, were absorbed only in the uppermost regions of these products. The rest of the added water remained supernatent, and the product stayed essentially dry. Thus, neither of the commercially available products reconstituted to an appreciable extent.

The products produced in accordance with the present invention absorbed all of the added water, none of which remained supernatent, except for a slight amount for the product sample containing 17% lard. Using the procedure described above, the uniformity of reconstitution for the product of the present invention were determined to be as follows:

|  | Products | | | | | |
|---|---|---|---|---|---|---|
|  | Invention | | | | Carnation | Gilroy |
| Cylinder Sections | Lard Level (%) | | | | | |
| Moisture (%) | 0 | 7 | 14 | 17 | 14 | 0 |
| 1. Top | 71.5 | 68.2 | 66.2 | 66.9 | — | — |
| 2. Upper Middle | 69.9 | 67.3 | 68.0 | 66.5 | — | — |
| 3. Lower Middle | 67.1 | 67.2 | 68.5 | 65.7 | — | — |
| 4. Bottom | 67.7 | 67.4 | 67.5 | 66.8 | — | — |

EXAMPLE IV

Following the procedure set forth in Example II, a batch of dehydrated bean product was made from a formulation containing 14% lard. The resultant pellets were then crushed through Tyler screens into the following fractions:

|  | Tyler Screen Mesh Size | |
|---|---|---|
|  | +12 | −12+20 |
| Bulk Index (cc/100 gms) | 240 | 245 |
| Bulk Density (gm/cc) | 0.42 | 0.41 |
| Total volume (mls) after water addition | 305 | 305 |
| Volume (mls) supernatent water | 0 | 30 |

Each of these fractions of dehydrated bean product were rehydrated as in EXAMPLE III to determine the uniformity of reconstitution. The results are tabulated below:

| Cylinder Sections | Tyler Screen Mesh Size | |
|---|---|---|
| Moisture (%) | +12 | −12+20 |
| 1. Top | 68.8 | 68.6 |
| 2. Upper Middle | 68.4 | 68.4 |
| 3. Lower Middle | 67.4 | 67.5 |
| 4. Bottom | 67.6 | 66.0 |

EXAMPLE V

Bean mixtures, formulated to contain 14% lard and 3.3% salt, were processed into dehydrated products using the procedure described with respect to EXAMPLE II, except that the mixtures were formed into pellets by extrusion through die plates having orifice sizes indicated below. The dry products compared with each other and the Carnation product as follows:

|  | Products of the Present Invention | | | | | Carnation |
|---|---|---|---|---|---|---|
|  | Die Plate Diameter | | | | | |
|  | 1/8″ | 3/16″ | 1/4″ | 3/8″ | 1/2″ | |
| Bulk Index (cc/100 gm) | 250 | 255 | 260 | 275 | 275 | 300 |
| Bulk Density (gm/cc) | 0.40 | 0.39 | 0.39 | 0.36 | 0.36 | 0.33 |
| Content of +12 mesh bean particles as % of nonlipid solids | 6.8% | 9.0% | 13.1% | 11.4% | 29.0% | 0.0% |

Using procedure disclosed above, the bean products reconstituted as follows:

|  | Products of Present Invention | | | | | |
|---|---|---|---|---|---|---|
| Cylinder Sections | Die Plate Diameters | | | | | |
| Moisture (%) | 1/8″ | 3/16″ | 1/4″ | 3/8″ | 1/2″ | Carnation |
| Top | 69.1 | 66.2 | 68.7 | 68.3 | 67.8 | — |
| Upper Middle | 71.1 | 68.0 | 68.3 | 70.1 | 67.2 | — |
| Lower Middle | 70.7 | 68.5 | 67.9 | 69.5 | 64.9 | — |
| Bottom | 69.7 | 67.7 | 67.1 | 69.2 | 63.9 | — |

Consistent with Example III, the Carnation product did not reconstitute in the absence of physical agitation, whereas the rehydration of the product of the present invention was essentially uniform.

EXAMPLE VI

Dried bean product produced in accordance with Example II was divided into seven 50 gm samples, each of which was added to a 500 ml. beaker. 150 gm of water having a temperature of 200° F. were poured into each of the beakers. Each of the seven samples were then permitted to quiescently rehydrate for a prescribed time as indicated below. Afterwards, the excess water was drained for 15 seconds through a 20-mesh Tyler screen. The initial rehydration ratios and moisture absorption rates are tabulated below.

In comparison, seven 50 gm samples of the Carnation product were also subjected to the same procedure, except that these samples had to be stirred quickly in order to fully rehydrate without exhibiting dry-pocketing. The rehydration ratios and moisture absorption rates for these samples are also tabulated below.

|  | Product of the Invention | | Carnation | |
|---|---|---|---|---|
| Rehydration Time (sec) | Moisture Absorption Rate | Rehydration Ratio | Moisture Absorption Rate | Rehydration Ratio |
| 5 | .18 | 1.90 | .6 | 4.0 |
| 10 | .129 | 2.29 | .3 | 4.0 |
| 20 | .069 | 2.38 | .15 | 4.0 |
| 30 | .061 | 2.83 | .10 | 4.0 |
| 45 | .048 | 3.14 | .067 | 4.0 |
| 60 | .041 | 3.44 | .05 | 4.0 |
| 90 | .029 | 3.61 | .033 | 4.0 |

The Carnation product required stirring in order to fully reconstitute. When attempts were made to rehydrate the product without stirring, a barrier film of pasty material formed immediately upon the exterior of the product contacted with water, thereby hindering further rehydration. The product was agitated in order to expose all of the dried product to the rehydrating liquid, whereupon reconstitution occurred almost immediately.

Ideally, the rate of absorption should be such that the rehydration liquid will flow between product particles into all of the void areas therebetween before substantial absorption of water by the dried product occurs. This is the case for the product produced in accordance with the present invention which, as indicated by the tabulated data, exhibits a more moderate rehydration rate which permits the water to permeate the total volume of the dry product for complete rehydration without the need for stirring or mixing.

From the foregoing description, one skilled in the art can easily ascertain the essential characteristics of this invention and without departing from the spirit and scope thereof, can make various changes and modifications of the invention to adapt it to various usages and conditions.

What is claimed is:

1. A process for producing a dehydrated legume product capable of reconstitution into a legume paste having detectable chunkiness comprising:
   (a) mashing cooked leguminous material having a moisture content within the range of about 45–75% to form a mash including a mixture of cooked leguminous particles and paste-like material;
   (b) forming said mash into shapes having a piece size within the range ⅛ to ½ inch; and
   (c) dehydrating said shapes to produce a dehydrated product exhibiting a moisture content of less than 12% by weight, a bulk density within the range of 0.28 gm/cc–0.56 gm/cc and an initial rehydration ratio within the range 1.75:1.0 to 3.75:1.0, said dehydrated product containing an amount greater than about 5% by dry weight of legume particles having a size greater than 12 mesh.

2. A process in accordance with claim 1, wherein said bulk density falls within the range of about 0.35 to 0.45 gm/cc.

3. A process in accordance with claim 1, wherein said amount of legume particles having a size greater than 12 mesh is within the range of about 9.0 to 30% by dry weight.

4. A process in accordance with claim 1 further comprising adding additional legume particles to said product.

5. A process in accordance with claim 4, wherein said particles are added to said mash.

6. A process in accordance with claim 5, wherein said additional legume particles are dehydrated legume product.

7. A process in accordance with claim 1, wherein said moisture content of said mash is within the range of about 50 to 65% by weight.

8. A process in accordance with claim 1, further comprising the step of including lipid material in said mixture.

9. A process in accordance with claim 1, wherein said legumes are cooked by subjecting the legumes to heat while agitating said legumes.

10. A process in accordance with claim 9, wherein said agitating is accomplished by rotating a vessel in which said legumes are cooked.

11. A process in accordance with claim 10, wherein said vessel is rotated every 2 to 5 minutes during said subjecting the legumes to heat.

12. A process in accordance with claim 11, further comprising venting said vessel for between 10 to 60 seconds after said vessel is rotated.

13. A process in accordance with claim 1, wherein said leguminous material is selected from the group consisting of peas of the Pisum genus and beans of the Phaseolus genus.

14. A process in accordance with claim 13, wherein said beans are selected from the group consisting of pinto, pink, and red beans.

15. A process in accordance with claim 14, wherein said beans are pinto beans.

16. A dehydrated foodstuff produced by the method of claim 1 comprising leguminous material capable of essentially instant, substantially uniform reconstitution into a legume paste having detectable chunkiness, such foodstuff containing an amount greater than about 5% by dry weight of legume particles having a size greater than 12 mesh and having a moisture content of less than about 12% by weight, a bulk density within the range of 0.28 gm/cc–0.56 gm/cc and an initial rehydration ratio within the range of 1.75:1.0 to 3.75:1.0.

17. A dehydrated foodstuff in accordance with claim 16, wherein said moisture content is within the range of 6 to 8% by weight.

18. A dehydrated foodstuff in accordance with claim 16, wherein said bulky density is within the range of 0.35 to 0.45 gm/cc.

19. A dehydrated foodstuff in accordance with claim 18, in the shape of a pellet having a diameter of at least 3/16 inch.

20. A dehydrated foodstuff in accordance with claim 16, wherein said amount falls within the range of 9.0 to 30%.

21. A dehydrated foodstuff in accordance with claim 16, wherein said leguminous material is present in an amount up to 100% by total dry weight solids.

22. A dehydrated foodstuff in accordance with claim 21, wherein said foodstuff further comprises lipid material in a maximum amount of 25% by total dry weight solids and salt in a maximum amount of 5% by total dry weight solids.

23. A dehydrated foodstuff in accordance with claim 16, having an initial moisture absorption rate within the range of 0.15 to 0.55.

24. A dehydrated foodstuff in accordance with claim 16, wherein said leguminous material is selected from the group consisting of peas of the Pisum genus and beans of the Phaseolus genus.

25. A dehydrated foodstuff in accordance with claim 24, wherein said beans are selected from the group consisting of pinto, pink and red beans.

26. A dehydrated foodstuff in accordance with claim 25, wherein said beans are pinto beans.

27. A method for preparing a legume product comprising:
   rehydrating said dehydrated, mashed legume material of claim 1 shaped into a size within the range of ⅛ to ½ inch and containing an amount greater than about 5% by dry weight of legume particles having a size greater than about 12 mesh and having a moisture content of less than 12% by weight, a bulk density within the range of 0.28 gm/cc to 0.56 gm/cc and a rehydration ratio within the range of 1.75:1.0 to 3.75:1.0 to produce a paste-like product having detectable chunkiness.

28. A reconstituted legume product prepared by the process of claim 27.

* * * * *

UNITED STATES PATENT AND TRADEMARK OFFICE
CERTIFICATE OF CORRECTION

PATENT NO. : 4,676,990

DATED : June 30, 1987

INVENTOR(S) : Samuel J. HUFFMAN et al.

It is certified that error appears in the above-identified patent and that said Letters Patent is hereby corrected as shown below:

At column 3, line 37, insert ---the--- between "by" and "dehydrated".
At column 4, line 52, change "vapour" to ---vapor---.
At column 4, lines 54 and 55, insert ---into a--- between "and" and "finely".
At column 5, line 11, insert ---the--- between "finished-dried" and "dehydrated".
At column 6, line 52, insert ---exhibits when--- between "product" and "made in. . .".
At column 6, line 53, delete "exhibits".
At column 7, line 16, change "product" to ---products---.
At column 7, line 58, change "admixture" to ---a mixture---.
At column 8, line 3, replace "in" between "screen" and "then" with "is".
At column 8, line 37, insert ---by--- between "or" and other".
At column 8, line 38, change "technique" to ---techniques---.
At column 9, line 13, change "K%K" to ---K&K---.
At column 9, line 15, change "K$K" to ---K&K---.

UNITED STATES PATENT AND TRADEMARK OFFICE
CERTIFICATE OF CORRECTION

PATENT NO. : 4,676,990

DATED : June 30, 1987

INVENTOR(S) : Samuel J. HUFFMAN et al.

It is certified that error appears in the above-identified patent and that said Letters Patent is hereby corrected as shown below:

At column 9, line 17, replace "affect" to ---effect---.
At column 11, line 25, change "product" to ---products---.

Signed and Sealed this

Twentieth Day of September, 1988

Attest:

DONALD J. QUIGG

Attesting Officer

Commissioner of Patents and Trademarks